United States Patent
Wheeler et al.

[15] 3,661,738
[45] May 9, 1972

[54] SYSTEM FOR MELTING MELT ENRICHING SOLIDS UTILIZING EXCESS HEAT FROM ELECTROLYSIS CELLS

[72] Inventors: Roger M. Wheeler, Tulsa, Okla.; Frank E. Love, Snyder, Tex.

[73] Assignee: American Magnesium Company, Tulsa, Okla.

[22] Filed: June 29, 1970

[21] Appl. No.: 50,849

[52] U.S. Cl. ..............................................204/70, 204/234
[51] Int. Cl. ......................................C22b 45/00, B01k 3/00
[58] Field of Search ..................................204/70, 233, 234

[56] References Cited

UNITED STATES PATENTS

| | | | |
|---|---|---|---|
| 1,967,550 | 7/1934 | Camescasse | 204/70 |
| 2,418,223 | 12/1968 | Love | 204/70 |

Primary Examiner—F. C. Edmundson
Attorney—Head & Johnson

[57] ABSTRACT

A method of melting melt enriching solids to provide cell melt to an electrolysis cell for the production of magnesium and chlorine comprising withdrawing hot depleted cell melt from the electrolysis cell, conveying the depleted melt to a mixing station, admixing melt enriching solids with the depleted cell melt in the mixing station, the melt enriching solids being melted by heat of the depleted cell melt which is thereby enriched and cooled, and conveying the enriched cell melt to the electrolysis cell.

14 Claims, 1 Drawing Figure

PATENTED MAY 9 1972 3,661,738
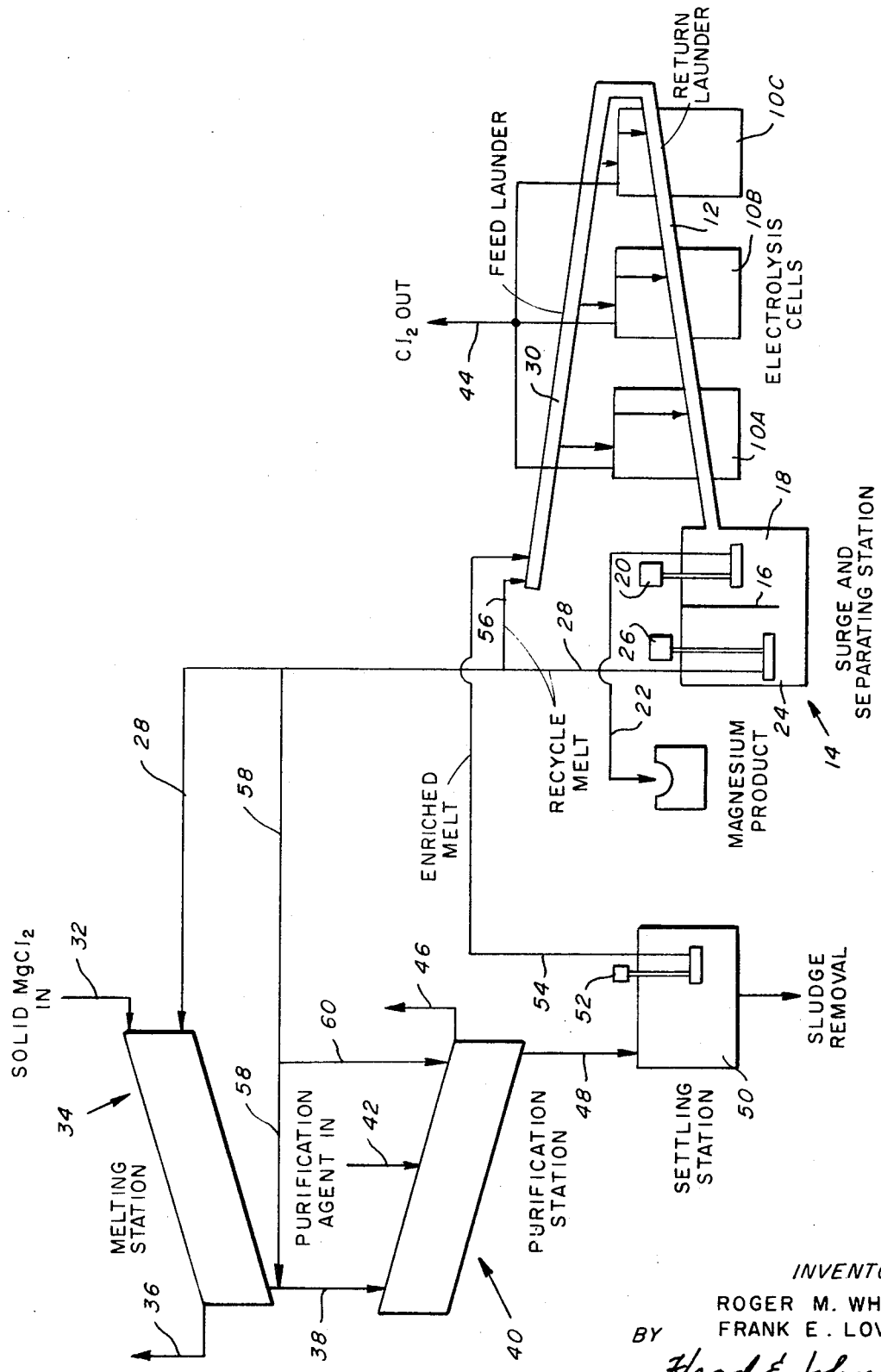
INVENTORS.
ROGER M. WHEELER
FRANK E. LOVE
BY
Head & Johnson
ATTORNEYS

SYSTEM FOR MELTING MELT ENRICHING SOLIDS UTILIZING EXCESS HEAT FROM ELECTROLYSIS CELLS

BACKGROUND, SUMMARY AND OBJECTS OF THE INVENTION

A known method of producing magnesium metal, and chlorine, includes the use of magnesium chloride bearing salts as raw material. Such salts are frequently obtained from brine high in magnesium chloride content. Water content of the brine is evaporated off, such as in a spray dryer, or some other type of drying apparatus. After removal of water the magnesium chloride bearing salt is in solid form. If water is removed in a spray dryer the magnesium chloride bearing salt is in solid particulate form, or powder, although the particle size and shape may vary. Such material may be used as melt enriching solids in the electrolytic production of magnesium. In some processes the powder is compressed into briquettes or blocks. In order to utilize melt enriching solids as cell feed, or to re-enrich cell melt, the solid material must be melted. U.S. Pat. No. 3,418,223 illustrates a process of producing magnesium metal utilizing solid magnesium chloride in which the solid material is melted in a melt furnace before subsequent use in cell feed. The cost of energy necessary to bring magnesium chloride bearing solids to a molten state in this type process is a substantial factor in the cost of the production of magnesium.

In the electrolytic process the cell melt, which consists in part of magnesium chloride, offers a resistive path to current flow. This resistive path causes heat to be generated. The total amount of heat generated in an electrolytic cell depends upon several factors, but a primary factor is the composition of the cell melt.

The current flowing through a cell must be regulated so that the temperature of the cell melt does not exceed process and equipment design limits. This invention provides means of utilizing excess heat of the cell melt, which results in the cooling of the cell melt and thereby permits electrolytic cells to operate at higher amperages.

Most melt enriching solids include a portion of water which is deleterious to electrolysis cell operation and equipment and must be removed. In the step of admixing melt enriching solids with hot cell melt an opportunity is presented for the flashing off of the water as steam. In the process of this invention this step takes place using depleted cell melt and therefore hydrolysis of the released water content with magnesium chloride is greatly reduced. Further, some processes of purifying cell melt result in the deposit of sludge. Since the process of this invention provides means of purifying the cell melt in which the cell melt may be constituted of a relatively small percent of magnesium chloride, the removal of sludge can be accomplished with minimum waste of magnesium chloride.

A basic object of this invention is to provide a method of melting melt enriching solids to provide cell melt for an electrolysis cell for the production of magnesium and chlorine.

A more particular object of this invention is to provide a method of melting melt enriching solids to provide cell melt for an electrolysis cell for manufacturing magnesium and chlorine including the use of excess heat from melting such solids.

Another object of the invention is to provide a method of melting melt enriching solids to provide cell melt for an electrolysis cell for the production of magnesium and chlorine utilizing the excess heat generated by the electrolysis cell and including the step of recycling a portion of the cell melt through melting and purification stations to provide an enriched melt and concurrently recycling the other portion of the cell melt directly through the electrolysis cells for maintaining heat balance in the system.

These and other objects of the invention are fulfilled by the methods and apparatus to be described in the following description and claims, taken in conjunction with the attached drawings.

DESCRIPTION OF THE DRAWING

The drawing is a diagram of a method of melting melt enriching solids to provide cell melt for electrolysis cells for the production of magnesium and chlorine.

DETAILED DESCRIPTION

Referring to the drawing, a bank of electrolytic cells is shown for use in the manufacture of magnesium metal and chlorine, the cells being indicated by the numerals 10A, 10B, and 10C. While three cells are shown such is merely exemplary. There may be only one cell or a large number of cells. Electrolysis cells, well known in the industry, utilize electrical potential applied to cathodes and anodes, the electrolytic action serving to separate magnesium chloride into magnesium and chlorine which are separately removed from the cells. By this electrolytic action the magnesium chlorine content of the cell melt is gradually depleted as magnesium and chlorine are withdrawn from the cell. This invention provides means for melting melt enriching solids in the process of re-enriching and replenishing cell melt for the production of magnesium metal and chlorine.

Magnesium metal and a portion of depleted cell melt is withdrawn from the electrolysis cells 10A, 10B, and 10C and flows by way of a return launder 12 to a surge and separating station generally indicated by the numeral 14. In the illustrated arrangement the surge and separating station 14 includes a cell separated by a semi-wall 16 into two compartments. First compartment 18, which may be termed a separating compartment or separating cell, receives the discharge of return launder 12. Magnesium metal separated in the electrolysis cells rises to the top within the separating compartment 18, and by means of pump 20 is conveyed by conduit 22 to be cast as solid metal or for transfer as molten magnesium. Additional steps of purification of the magnesium metal from conduit 22 may also be practiced if needed.

The cell melt portion received from return launder 12 passes under semi-wall 16 and into surge compartment 24. The depleted cell melt in compartment 24 is conveyed by pump 26 and conduit 28 for re-enrichment and return to the electrolytic cell.

Charging melt to the electrolytic cells is provided by way of feed launder 30 which discharges into each of the cells 10A, 10B, and 10C.

Melt enriching solids, which may be produced such as in a spray dryer, fluid fed dryer or the like, are furnished at 32 and are discharged into a melting station 34. Conduit 28 flows depleted cell melt into the melting station. The melt enriching solids and depleted cell melt are admixed in melting station 34, the heat of the depleted cell melt serving to melt the melt enriching solids. Gas including primarily hydrochloric acid and water vapor developed in the mixture of the melt enriching solids with the depleted cell melt is withdrawn at 36.

Melting station 34 may take a variety of forms but preferably is of a type which results in the complete melting of melt enriching solids with minimum hydrolysis. All known economically feasible processes of dehydrating brine to produce melt enriching solids result in the solid product having a portion of water. At elevated temperatures, encountered in attempting to melt the solid product, hydrolysis takes place resulting in the production of hydrochloric acid, magnesium oxide, and its intermediate magnesium oxychloride. These products are all deleterious to the operation of electrolysis cells. Thus melting station 34 is preferably of the type which achieves the melting of melt enriching solids by the hot depleted cell melt in a manner resulting in a minimum amount of hydrolyzation. Reference may be had to copending application Ser. No. 801,476, filed Feb. 24, 1969, titled "Method Of Dehydrating Magnesium Chloride Powder." The flowing stream process of the above reference application Ser. No. 801,476, is a good example of a method of achieving melting with minimum hydrolysis. It is understood that this invention is not limited to the use of this type of melting station and that other arrangements for admixing the solid magnesium chloride and depleted cell melt will function satisfactorily.

The enriched cell melt flows from discharge 38 into a purification station 40. In order to economically electrolyze magnesium chloride the cell melt must have a composition which does not exceed a preselected contaminant level. Contaminants include water, sulfates, boron, carbon, metallic impurities, chlorides, and magnesium oxide. The purpose of purification station 40 is to reduce these impurities which might be contained in the discharge from melting station 34, to make the melt acceptable for electrolysis. Purification station 40 may be in the form of a mixing vessel with agitators or a cascade purification system in which magnesium metal or magnesium metal contained in refining or electrolysis cell sludge is injected at 42. Another type of purification station 40 is a chlorination tower in which chlorine is injected into the cell melt in the presence of carbonaceous material. In such arrangement chlorine withdrawn from electrolysis cells 10A, 10B, and 10C by way of conduit 44 may be injected at 42 as the purification agent. Gas released in purification station 40 is withdrawn at 46. The enriched, purified cell melt is withdrawn at 48.

The output at 48 of the purification station is discharged to a settling station 50. Here sludge, if any, is permitted to settle out of the cell melt for removal. Depending upon the type and effectiveness of purification station 40 settling station 50 may not be necessary.

Pump 52 conveys the enriched cell melt by conduit 54 to the feed launder 30. The enriched melt flows into the electrolysis cells and the process is continued with the cell melt being continuously depleted in the electrolysis cell and replenished and enriched in melting station 34.

In the process described to this point the entire recycled cell melt is circulated through the melting station 34, purification station 40, settling station 50, and back to the electrolytic cells. An alternate embodiment includes a bypass conduit 56 extending from conduit 28 by which a portion of the recycled melt is fed directly back to the feed launder 30.

To maintain optimum temperatures throughout the system, controlled flows of hot melt may also be recycled by way of conduits 58 and 60. By regulation of the flow of recycled cell melt to various parts of the system the heat balance of the system and the composition of the cell feed may be more easily controlled.

By the system of this invention the only heat required for melting the melt enriching solids for enrichment of the cell melt is the excess heat produced by the electrolysis cells. This materially reduces the energy which is normally consumed in the melting of the melt enriching solids in the formation of enriched cell melt and permits electrolysis operation at higher amperage with resultant higher production.

While the temperatures of the system can vary greatly according to many design parameters, in a practical application of the invention the temperature of the cell melt fed by means of conduit 28 into melting station 34 may be approximately 1,400° F. As a result of the heat absorbed in the melting of melt enriching solids the temperature of the enriched cell melt in conduit 54 may be 1,160° F., which means a loss of approximately 240° in the process of melting the solid material. This cooled, enriched cell melt is fed back to the electrolysis cells with the excess heat due to the internal resistance of the electrolysis cells being thereby absorbed and utilized.

It can be seen that the process of this invention achieves the results of reducing the energy required to produce magnesium and chlorine from melt enriching solids by utilizing excess heat of electrolysis and at the same time provides means for utilizing excess heat produced in the electrolysis cells.

The expression "melt enriching solids" as used herein means solids of any composition bearing magnesium chloride usable, before or after purification, for the enrichment of electrolyte used in the electrolytic production of magnesium; thus "melt enriching solids" means electrolyte enriching solids. The expression "depleted cell melt" means melt having magnesium chloride content below an optimum level for electrolytic cell operation; thus "depleted cell melt" includes partially depleted cell melt.

While the invention has been described with a certain degree of particularity it is manifest that many changes may be made in the details of construction and the arrangement of components and steps of the invention without departing from the spirit and scope thereof. It is understood that the invention is not limited to the exemplified embodiment set forth herein but is to be limited only by the scope of the attached claim or claims, including the full range of equivalency to which each element or step thereof is entitled.

What is claimed:

1. A method of melting melt enriching solids to provide cell melt for an electrolysis cell for the production of magnesium and chlorine comprising:

withdrawing hot depleted cell melt from an electrolysis cell;
   conveying the depleted cell melt to a melting station;
   admixing melt enriching solids with the depleted cell melt in the melting station, the melt enriching solids being melted by heat of the depleted cell melt which is thereby enriched and cooled; and
   conveying the enriched cell melt to the electrolysis cell.

2. A method of melting melt enriching solids to provide cell melt to an electrolysis cell for the electrolytic production of magnesium and chlorine according to claim 1 wherein electrolytically produced magnesium is withdrawn from the electrolysis cell with the depleted cell melt, and including the step of:

discharging the hot depleted cell melt and magnesium into a separation cell; and
   separating out magnesium content of the depleted cell melt, the depleted cell melt being subsequently conveyed to the melting station.

3. A method of melting melt enriching solids to provide cell melt for an electrolysis cell for the electrolytic production of magnesium and chlorine according to claim 1 including the step of:

passing the enriched cell melt from the melting station through a purification station for the reduction of deleterious components before conveying the enriched cell melt to the electrolytic cell.

4. A method of melting melt enriching solids to provide cell melt for an electrolysis cell for the electrolytic production of magnesium and chlorine according to claim 3 including the step of:

conveying the enriched cell melt from the purification station to a settling station wherein sludge is settled out, the enriched cell melt being conveyed from the settling station to the electrolytic cell.

5. A method of melting melt enriching solids to provide cell melt for an electrolysis cell for the electrolytic production of magnesium and chlorine according to claim 1 including the step of:

conveying only a portion of the depleted cell melt withdrawn from the electrolysis cell to the mixing station and mixing the balance thereof with the enriched cell melt prior to conveying the enriched melt to the electrolysis cell.

6. A method of melting melt enriching solids to provide cell melt for a plurality of electrolysis cells for the electrolytic production of magnesium and chlorine according to claim 1 including the step of withdrawing hot depleted cell melt from the plurality of electrolysis cells into a return launder and conveying the depleted cell melt from the return launder to the melting station.

7. A method of melting melt enriching solids to provide cell melt for a plurality of electrolysis cells for the electrolytic production of magnesium and chlorine according to claim 1 including the step of conveying the enriched cell melt into a feed launder and discharging the enriched cell melt from the feed launder into the electrolysis cells.

8. A method of melting melt enriching solids to provide cell melt for an electrolysis cell for the electrolytic production of magnesium and chlorine comprising:

withdrawing depleted cell melt and magnesium from the electrolysis cell and discharging the same into a separation cell wherein the magnesium rises to the upper portion of the separation cell;

withdrawing magnesium from the upper portion of the separation cell;

withdrawing depleted cell melt from the lower portion of the separation cell and discharging it into a melting station;

admixing melt enriching solids with the depleted cell melt in the mixing station, the heat of the depleted cell melt serving to melt the melt enriching solids to thereby enrich the cell melt;

conveying the enriched cell melt to a purification station; and conveying the purified enriched cell melt from the purification station to the electrolysis cell.

9. A method of melting melt enriching solids to provide cell melt for an electrolysis cell for the electrolytic production of magnesium and chlorine according to claim 8 including the step of:

discharging the purified enriched cell melt from the purification station to a settling station wherein sludge is settled out of the melt, the melt being conveyed to the electrolysis cell and the sludge periodically removed.

10. A method of melting melt enriching solids to provide cell melt for an electrolysis cell for the electrolytic production of magnesium and chlorine according to claim 8 including the step of:

discharging a portion of the depleted cell melt withdrawn from the lower portion of the separation cell into the melting station and mixing the balance with the purified enriched cell melt from the purification station before the same is conveyed to the electrolysis cell.

11. A method of melting melt enriching solids to provide cell melt for a plurality of electrolysis cells for the production of magnesium and chlorine according to claim 10 including the step of discharging a portion of the depleted cell melt withdrawn from the lower portion of the separation cell into the melting station, discharging the balance of the depleted cell melt onto a feed launder, and conveying the purified enriched cell melt from the purification station to the feed launder, the recycled depleted cell melt and the enriched purified cell melt mixing in the feed launder and being fed to the electrolysis cells.

12. A method of melting melt enriching solids to provide cell melt for a plurality of electrolysis cells for the electrolytic production of magnesium and chlorine according to claim 8 including the step of withdrawing depleted cell melt from the plurality of electrolysis cells into a return launder and conveying the depleted cell melt by way of the return launder to the separation cell.

13. A method of melting melt enriching solids to provide cell melt for a plurality of electrolysis cells for the production of magnesium and chlorine according to claim 8 including the step of conveying the purified enriched cell melt from the purification station to a feed launder and by way of the feed launder to the electrolysis cells.

14. A method of melting melt enriching solids to provide cell melt for an electrolysis cell for the electrolytic production of magnesium and chlorine according to claim 8 including discharging only a portion of the depleted cell melt withdrawn from the lower portion of the separation cell into the melting station and recycling the balance of the depleted cell melt through selected portions of the system to supply heat as needed in the system.

* * * * *